Figure 1:
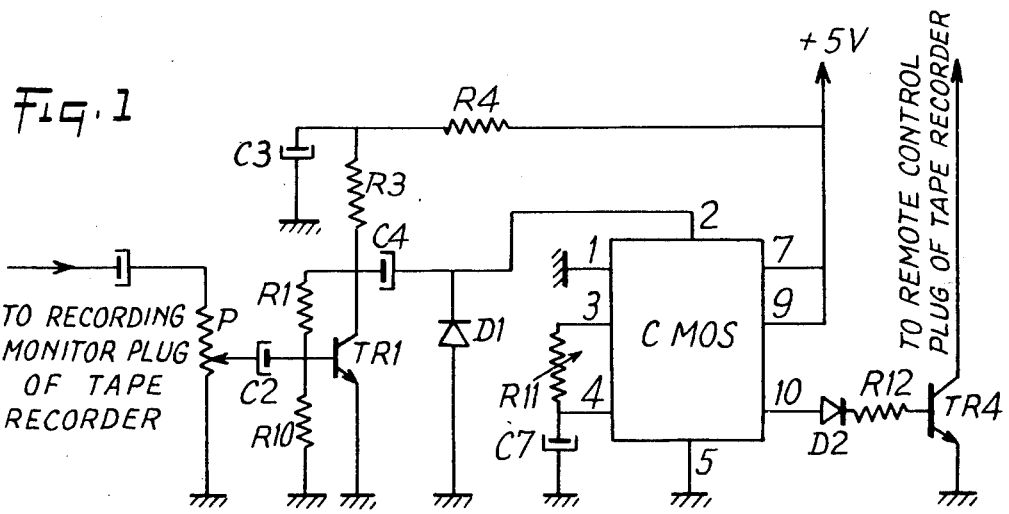

United States Patent [19]

Kanny

[11] 4,450,546

[45] May 22, 1984

[54] SPEECH CONTROLLED START-STOP OF TAPE RECORDER IN RECORD AND REPRODUCE MODES BY SEPARATE MICROPHONE

[76] Inventor: Louis Kanny, rue Savier, 35, Malakoff, France, 92240

[21] Appl. No.: 355,755

[22] PCT Filed: Jun. 29, 1981

[86] PCT No.: PCT/FR81/00085
§ 371 Date: Feb. 25, 1982
§ 102(e) Date: Feb. 25, 1982

[87] PCT Pub. No.: WO82/00217
PCT Pub. Date: Jan. 21, 1982

[30] Foreign Application Priority Data

Jul. 1, 1980 [FR] France ............................ 80 14601

[51] Int. Cl.³ .................................................. G11B 15/18
[52] U.S. Cl. ........................................ 369/24; 369/25
[58] Field of Search ............... 381/110; 360/74.1; 369/19, 20, 24, 25, 50

[56] References Cited

U.S. PATENT DOCUMENTS 3,614,336 10/1971 Patey .................................. 369/50
4,000,517 12/1976 Brickerd, Jr. ..................... 360/74.1
4,323,999 4/1982 Yoshizawa et al. ................ 369/19
4,342,106 7/1982 Sato et al. .......................... 369/7

Primary Examiner—George G. Stellar
Attorney, Agent, or Firm—Charles E. Pfund

[57] ABSTRACT

The invention relates to an improvement in the use of tape recorders and enables by speech action, the automatic start and stop of these apparatuses.

The device uses the main existing output plugs of a cassette recorder without introducing any modification whatsoever in the apparatus.

It comprises an amplifier with transistors of which the input receives the modulation delivered by a microphone; the output signals of the amplifier after detection by the diode $D_1$, control a flip-flop to a stable state which is constituted by a C MOS integrated circuit which delivers a positive pulse controlling an electronic switch $TR_4$ triggering the automatic start-stop.

Amongst the most interesting applications are conference recordings, letter dictations, surveillance of premises, language studies, preparation to speech, without manipulating the manual control start-stop of the apparatus.

7 Claims, 2 Drawing Figures

SPEECH CONTROLLED START-STOP OF TAPE RECORDER IN RECORD AND REPRODUCE MODES BY SEPARATE MICROPHONE

The present invention relates to an improvement to the utilization of tape recorders, cassette recorders, and more generally of all playing-back apparatuses and speech processing apparatuses (dictating devices, interphone . . . ), allowing the automatic start-stop by addition of an electronic device which is enclosed or not within the apparatus and is capable of controlling by the speech action the automatic start and stop.

In the known utilizations of this kind, the start and stop of the tape recorder are achieved manually through the apparatus switch, this forces the user to stay next to the apparatus and diverts some of his attention to the start-stop manual operation. In other cases automatic stopping is controlled by signals prerecorded on a second track, which imposes a prerecording of the tape with the desired starting and stopping orders, but does not fulfil the aim of this invention.

The electronic device according to the invention, by using commerically available discrete electronic components, according to the basic circuit diagram (which comprises components which are common to a variant embodiment including an amplifier, a monostable flip-flop and a transistor which functions as an electronic switch) permits to avoid the drawbacks of a manually operated control swtich.

The novelty consists in using in the recording position the main existing output plugs of a cassette recorder (including the use of the internal of external microphone), without introducing any modification whatsoever in the apparatus and also in the realization of a low consumption miniaturized electronic circuit (2.5 multiampers without speech, 3.7 milliampers with speech).

The arrangement "tape recorder-additional circuit" actually constitutes "a kind of servo-system", the signals generated by the tape recorder being used after having been reshaped to control the run-stop movement. Due to the low consumption of the circuit, the power supply of the device can thus be derived from the tape recorder battery, whilst substantially keeping its autonomy.

The working of this system confers a flexibility of operation during recording because no manual actuation of the start-stop manual control key is necessary; the user speech when present sets the magnetic tape in motion and its absence triggers the tape stop; this system also affords to save the cassette magnetic tape during the time intervals without speech, with an adjustable time interval from 1 to 3 seconds or more if desired.

In a variant embodiment, the electronic device is constituted by the common elements of the basis diagram with a more sensitive amplifier and a microphone being added. The originality of this variant embodiment consists in the realization of a low-consumption miniaturized circuit, with an enclosed microphone (3.3 mA without signal and 4.7 mA with signal). This circuit is characterized by a more universal operation capability and can either be utilized in the recording position as previously described, or be utilized in the playing back position of the tape recorder by the simple swinging of a switch.

The working of this variant embodiment confers in the recording position a greater flexibility because it does not require the use of the recording monitor plug ("monitor output") which does not necessarily exist in all commerically available tape recorders.

In the playing back position of the tape recorder the electronic circuit allows the automatic stop and start control of the apparatus by the speech (it will be noted that in the recording position the control sequence is effected in the following order: start and then stop).

In this second type of utilization, it is possible to create "imaginary blank spaces" on a cassette which is destined for example for language study (sentence by sentence repetition which can take place as many times as desired by the user). It is no longer necessary to prepare specific "student-master" recordings with preset (and subsequently unchangeable) time intervals which hardly leave a few seconds for the student to repeat.

With this device, the basic time necessary for the repetition can be reinitiated as many times as desired and can be adjusted to more than 3 seconds if so wished.

Figure 2:
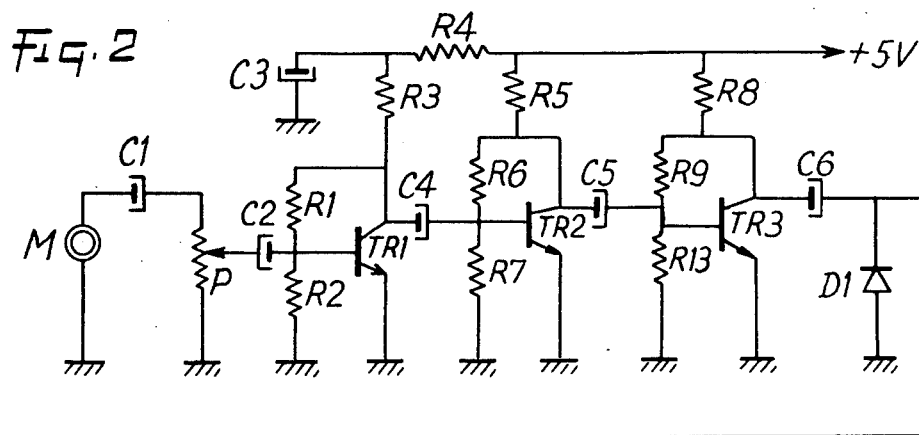
Figure 2:
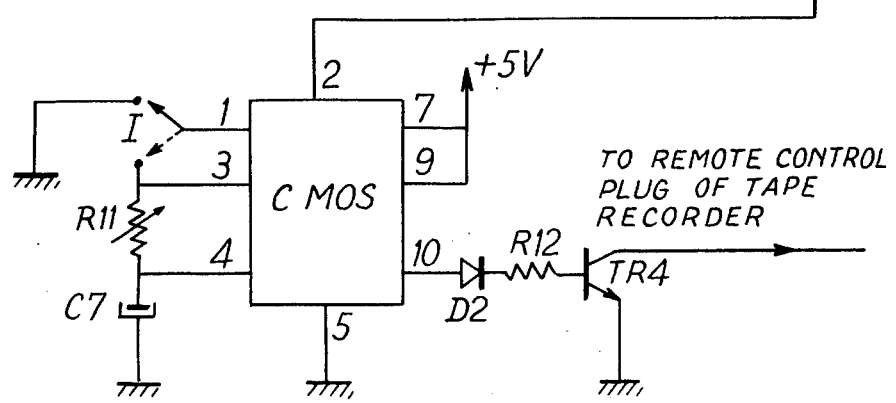

FIG. 1 of the single drawing sheet shows the basic circuit diagram and FIG. 2 shows the variant embodiment using elements which are common to the circuit of FIG. 1.

For information, the different numerical values of the components of both prototype circuits are as follows.

.R1, R6, R9=190 K$\Omega$;—R3, R5, R13, =12K$\Omega$; R8=5,6K$\Omega$; R4, R12=1K$\Omega$; R2, R7=82K$\Omega$; —R 10=20K$\Omega$, R11=470K$\Omega$.C1, C2, C4, C5, C6, C7=1 $\mu$F–C3, C5=10$\mu$F .P=47K$\Omega$.

In the basic diagram, the electronic circuit shown in FIG. 1 is made on a small 50×30 millimeters plate the thickness of which is determined by the size of the transistor used, i.e. about 8 mm. The circuit-board made with loose wiring for development purposes can have its dimensions reduced by a rationalized lay-out and the use of miniaturized components,; the reduction in size can even lead to the incorporation of the circuit functions on a chip of an integrated circuit which can then be easily inserted in the tape recorders without increasing the bulk of these devices.

The electronic circuit comprises a class A-B amplifier with transistor TRI the input of which receives the low frequency modulation (the level of which is adjusted by a potentiometer P) which is outputted at the "recording monitor" plug (monitor plug) of the tape recorder; if this latter plug does not exist, the voltage signal can be derived with the suitable level from an internal connection of the tape recorder circuits.

The amplifier achieves with diode $D_1$, output capacitor $C_4$, a reshaping of the signals with a level and a phase which are suitable for controlling a monostable flip-flop constituted by a CMOS integrated circuit; this latter circuit generates a variable width positive pulse, the adjustment being achieved by an adjustable resistor R11 associated with a capacitor C7. The pulse controls a transistor TR 4 acting as an electronic switch which, by means of the "remote control" plug (remote plug) of the tape recorder, allows the energization of the driving motor for the magnetic tape.

The electronic circuit according to FIG. 2 (which is a variant embodiment of the above-mentioned device) is designed in the same configuration than the basic circuit (small dimensions which can be reduced) and comprises the same common elements, with a microphone M incorporated on the small plate being added, and a more sensitive amplifier being used. Depending on the microphone characteristics, an additional adapting stage may be found necessary. The microphone M drives through a potentiometer P (sensitivity adjustment) an amplifier with three transistors $TR_1$, $TR_2$, $TR_3$, the first two transistors working as "class A amplifier and the third one as a class AB amplifier, as in the basic circuit, the other components of the circuit being identical to those of the first circuit of FIG. 1. A two positions switch I is simply added, thus enabling a special operation of the CMOS integrated circuit; this switch, by its switching action on the output connections 1 and 3 of the integrated circuit enables the absence or the presence of output pulses controlling transistor $TR_4$.

Thus the electronic device can be operated at will in a recording mode or in a playing back mode. Due to the adjunction of the microphone to the circuit, it is possible to control either the remote control plug, or the power supply of the tape recorder; in the latter case, the energy saving in power supply is appreciable, because in the absence of signal (waiting position which is a kind of "improved pause" position of the tape recorder), the consumption is only of about 3 mA and it is not added to the consumption of the low frequency circuits (50 mA more depending on the type of apparatus) if only the "remote control" plug (power supply of the motor) is used to enable the start-stop of the tape recorder.

The device according to the invention can be applied to obtain an improvement in the utilization of tape recorders; it affords for example conference recordings, letter dictation. More generally its application will be found useful when the operator needs to have his hands free and to concentrate only on his subject or when the operator is at some distance (i.e. a few meters) from the apparatus and wants to actuate the start-stop control without having to go back near the recorder.

In the variant embodiment the device enables the operator to control automatically the recorder either in the recording position, or in the palying back position; in this latter case a preferred application will be training to language study, preparation to public speech by repeating alone sentence by sentence pre-recorded texts; the adjustment of the threshold level by the potentiometer P affords the possibility of checking the voice reach (if the voice is deemed insufficiently for reaching, the tape recorder will not stop, which directly gives to the student or his teacher the rating of his progress in this field).

More generally, the playing back position will be used when someone needs training for improving his elocution or his memory.

Due to its low consumption (about 3 to 5 mA) the device can be made fully autonomous by miniaturized batteries; this authorizes the imagination of many varied applications outside the field of the automatic control of the start-stop of tape recorders which was the original application of the study.

For example one further application could be the control of the high frequency section of a miniaturized transmitter as a protection against theft (house, car), to monitor a room with a sick person, children, or other premises . . . The list of application described therein is not limitative. One can further contemplate triggering a mechanical action or setting a sonor transmitter for example for sea bottom survey with the use of a microwave microphone in this case. Other applications, in the microwave range are also foreseeable every time a low consumption (3 mA for example or even less) survey or wait position is necessary for initiating an action which is mechanical or not but requires a larger current consumption.

In another field one can contemplate an application to interphone transmitters, the device when associated with these apparatuses enabling an automatic control of the on- and off- setting of the interphone connection without any manipulation of knobs and keys. Due to its low consumption, the device can be permanently plugged in, the interphone being itself powered only when there is a dialogue. Depending on the type of the intercommunication system full duplex conversation can be obtained, the "receiving" and "transmitting" functions being instantly and simultaneously effected by the asking correspondent voice which acts on the abovedescribed electronic device.

I claim:

1. Electronic device permitting by the speech action to control the automatic start and stop of a tape recorder comprising a microphone for producing low frequency input signals, an input signal re-shaping circuit, a flip-flop, and an electronic switch for controlling the motor of the tape recorder, characterized in that the microphone is constituted by an additional element which is autonomous from the recording microphone, and completely independent from the tape recorder recording and playing back circuits, and in that the device further comprises a two-position switch associated with the flip-flop to authorize an automatic control of the start-stop of the tape recorder when the latter is in a playing back position or in a recording position, a first position of the switch corresponding to the playing back operation of the tape recorder and triggering the stop through speech and the start through absence of the speech, and a second position of the switch corresponding to a recording operation of the tape recorder and triggering the start through speech and the stop through absence of speech.

2. Device according to claim 1, characterized in that the flip-flop comprises a (C MOS) integrated circuit with which is associated the two-position switch (I) permitting through the connection of a first and second pin of the (C MOS) integrated circuit, to obtain the presence or the absence of a voltage pulse at the positive level at the output of the flip-flop.

3. Device according to claims 1 or 2, characterized in that the level of the low frequency signals is controlled by a potentiometer (p) disposed between the microphone (M) and the input of the amplifier to allow an adjustment of the (C MOS) flip-flop triggering threshold.

4. Device according to claim 2, characterized in that the (C MOS) flip-flop comprises an adjustable resistor ($R_{11}$) and a capacitor ($C_7$) associated to the flip-flop to allow a control of the time constant of the positive voltage pulse delivered by the flip-flop, or the absence thereof.

5. Device according to any one of claims 1, 2 or 4, characterized in that the output signal of the (C MOS) flip-flop controls via a diode ($D_2$) of protection and a resistor ($R_{12}$), the basic current necessary, and controlled by said resistor, for saturating the electronic switch transistor ($TR_4$) and thus to allow the adjustment of the flow of current necessary to energize, via the output collector of the said switching transistor ($TR_4$) and of the tape recorder remote-control plug, the motor driving the tape recorder.

6. Device according to any one of claims 1, 2 or 4, characterized in that it comprises an autonomous power supply of low consumption associated with the additional microphone (M) and with the electronic circuits connected to the microphone for controlling the tape-recorder remote control plug.

7. Device according to any one of claims 1, 2 or 4, characterized in that it comprises an autonomous power supply of low consumption associated to the additional microphone (M) and to the electronic circuits connected to the microphone for controlling the general supply of the magnetophone.

* * * * *